Patented Dec. 1, 1953

2,661,281

UNITED STATES PATENT OFFICE 2,661,281

PRODUCTION OF CAST IRON

Henton Morrogh, Alvechurch, England, assignor to The British Cast Iron Research Association, Birmingham, England No Drawing. Application April 26, 1949, Serial No. 89,800

12 Claims. (Cl. 75—123)

This invention relates to the production of cast iron and in particular to the production of cast irons containing calcium.

The introduction of calcium into cast iron on a commercial scale presents difficulties which have hitherto been regarded as insuperable. If metallic calcium is added to molten iron at the temperature normally used, say 1250° C.–1400° C., the first effect of the addition is to combine with the sulphur in the iron to give calcium sulphide which, being relatively light and insoluble in molten iron, floats to the surface of the melt. Thereby the melt is desulphurised. This desulphurising effect of calcium is well-known. When, however, the sulphur has been substantially removed it might be thought that any further calcium additions would dissolve in cast iron and alloy with the material in the normal manner. It has been found, however, that additions of calcium to irons which have been desulphurised, or which have had an initially low sulphur content, result, at temperatures of 1250° C.–1400° C. not in the solution of the calcium, but in its conversion to the insoluble calcium oxide which floats on the surface of the molten metal. Additions of calcium alloys such as, for instance copper-calcium, nickel-calcium and calcium-silicon, and compounds such as calcium carbide, lead to the same result.

I have now found that if calcium is added to molten iron and the temperature is raised to 1650° C. or higher, the calcium oxide layer first formed reacts to form calcium carbide which, at least in part, dissolves in the iron at these temperatures, and there is produced an iron containing calcium. Calcium carbide itself may be added to molten iron at 1650° or higher and dissolves in the metal. At lower temperatures, as above noted, calcium oxide is formed, and this can be converted into calcium carbide by raising the temperature of the molten iron. Other calcium-oxide generating substances, such as calcium metal or alloys, calcium silicide, calcium carbonate, dolomite, stabilised dolomite, or calcium hydroxide, behave similarly.

I have further found that, if an iron is used which is hypereutectic in relation to carbon and which gives a grey cast iron on casting, the introduction of calcium by this method leads to a grey cast iron in which the free carbon is present partly or wholly in the form of nodular graphite, with consequent marked enhancement of the mechanical properties of the cast iron. The improvement is of the same order as I have described in my co-pending application Serial No. 760,118 and continuation-in-part application Ser. No. 72,575 (Patent No. 2,488,511, November 15, 1949) in connection with grey cast irons containing cerium.

It is an object of the present invention to provide an iron containing calcium. A further object is to provide a method of introducing calcium into iron. A still further object is to produce a grey cast iron containing calcium in which the free carbon is present partly or wholly in the form of nodular graphite. A still further object is to provide a calcium-containing grey cast iron of markedly enhanced mechanical properties in comparison with similar irons containing no calcium. Other objects will apear from the description which follows.

These objects are achieved according to the present invention, which consists primarily in adding a calcium-oxide-generating substance to molten iron, converting the oxide (assuming the addition is made at a melt temperature low enough for the oxide to be formed and/or persist in contact with the molten iron into calcium carbide at a temperature of at least 1650° C., and maintaining the whole at that temperature until at least part of the calcium carbide has dissolved in the molten iron.

The calcium-oxide-generating substance may be metallic calcium or a calcium alloy such as copper-calcium, nickel-calcium, silicon-calcium, or may be calcium compounds such as calcium carbide, calcium carbonate, calcium salts of organic acids such as calcium oxalate, calcium hydroxide, refractory materials containing calcium oxide and/or calcium silicate.

The addition may be made at the usual melting temperature i. e. at 1250°–1400° C. in which case calcium oxide is at once produced as a layer on the molten iron. The temperature is then raised to at least 1650° C. (preferably 1700°) at which temperature the excess of calcium oxide remaining, after such desulphurization as may be necessary has taken place, is converted into calcium carbide and the latter gradually dissolves.

Alternatively the addition may be made after the molten iron has been heated to at least 1650° C. If the addendum chosen is calcium carbide it remains as such and gradually dissolves in the molten iron at these temperatures. If one of the other addenda is chosen, calcium oxide is first formed and is then converted into calcium carbide, which gradually dissolves. It is to be noted that the calcium carbide is produced without the addition of free carbon to the slag.

Calcium oxide and consequently all calcium-oxide-generating substances are desulphurising agents. The iron will usually contain sulphur—sometimes as much as 0.1% or even more—and the quantity of calcium-oxide-generating substance added must be sufficient to reduce the sulphur content to 0.02% or less. Only when the sulphur content has been reduced to this extent does the introduction of calcium into the iron begin. A preliminary desulphurisation with known desulphurising agents may be effected if desired, but the calcium-oxide-generating substances are not expensive and there is no objection to using them in excess.

The amount of calcium which can be introduced into iron by the process of the invention is limited by the solubility of calcium carbide in molten iron. This is appreciable at 1650° C. and increases somewhat with rise of temperature. I have succeeded in producing cast iron containing from 0.02 to 0.25% of calcium by using temperatures of 1650–1750° C.

The most important embodiment of the invention is its application to hypereutectic irons which give grey cast irons. An iron is said to be hypereutectic (in relation to carbon) when the percentage of carbon present exceeds $$4.3 - \tfrac{1}{3}(P+Si)$$

where P and Si are the percentages of phosphorus and silicon respectively. In the absence of appreciable amounts of iron carbide-stabilizing elements such as chromium, manganese, tellurium, boron, vanadium and sulphur, and provided the silicon content is adjusted so that it is appropriate for the rate of cooling of the casting, according to the principles well-known in iron foundry practice, a hypereutectic iron will solidify with a substantial part of its carbon content in the form of flakes distributed through the metallic mass. This flake graphite is the cause of the poor shock-resistance and other mechanical properties of ordinary grey cast iron.

The addition of 0.02% or more of calcium to such irons (i. e. to hypereutectic irons which give grey castings) causes the hypereutectic carbon to appear partly or wholly in the form of nodular graphite instead of a flake graphite, and the shock resistance and other mechanical properties of the cast iron are thereby vastly improved. The sole conditions for success in this respect are that the iron must in the as-cast state be hypereutectic and grey, and must contain calcium. The iron used as starting material may contain sulphur without limit provided sufficient calcium-oxide-generating substance is added to reduce the sulphur content in the cast iron to 0.02% or less. The starting material may contain any other elements normally present or added in the normal course of manufacture provided it is capable of giving a grey casting. The starting-material may even be hypoeutectic provided that graphite or carbon in some other form is added to the melt in sufficient quantity to ensure that the as-cast iron is hypereutectic. A deficit in carbon content may also be made up by the presence of 10% or more of nickel.

It is advantageous, when using the process of the invention for the production of grey cast iron with a nodular graphite structure, to add, after the introduction of the calcium, a graphitising inoculant such as ferrosilicon, graphite, silicon, or silicon-containing alloys of aluminium, calcium, manganese or zirconium.

The invention in one of its preferred forms is illustrated by the following example:

An iron of the following composition:

|  | Per cent |
|---|---|
| Total carbon | 4.02 |
| Silicon | 2.68 |
| Manganese | 0.57 |
| Sulphur | 0.018 |
| Phosphorus | 0.035 | was melted in a graphite crucible using a high-frequency induction furnace. The total weight of the charge was 8 lbs. When the metal was molten 1 oz. of pure calcium oxide was run on to the surface of the metal and the temperature was slowly raised to 1700° C. and held at this temperature for 20 minutes. At first the calcium oxide remained solid; after a time it became viscous due to the fact that some of it was being converted to calcium carbide and a relatively low-melting mixture of calcium carbide and calcium oxide was formed. With further heating, the non-metallic layer on the surface of the metal became solid again, indicating that it was converted completely to calcium carbide. The metal was then poured into a ladle containing a graphitizing inoculant, in this instance 1 oz. of ferro-silicon containing 80% of silicon and a test bar 0.875 inch diameter and 12 inches long was cast in a green sand mould. Examination of this test bar under the microscope revealed that it had a completely nodular graphite structure.

The analysis after treatment apart from the calcium content was:

|  | Per cent |
|---|---|
| Total carbon | 4.43 |
| Silicon | 3.01 |
| Manganese | 0.50 |
| Sulphur | 0.009 |
| Phosphorus | 0.03 |

| Tensile strength | 26.3 tons/sq. in. |
|---|---|
| Brinell hardness No | 194 |
| Transverse rupture stress | 50.2 tons/sq. in. |

The expression "suitable calcium addition agent" is employed in the appended claims as a generic term by which to designate any of the various types of calcium-containing compounds or substances, including calcium alloys, as well as calcium metal itself, hereinabove referred to by way of example as capable of serving as sources of available calcium for the purposes in view under the conditions of operation characterizing the process of the invention.

I claim:

1. Process for the production of cast iron containing calcium, which comprises adding a suitable calcium addition agent to molten iron in quantity more than sufficient to ensure reduction of any sulphur content of the iron to not more than 0.02 per cent, maintaining the temperature of the melt at not less than 1650° C. in order to ensure that calcium shall be present as carbide in contact with the molten iron, and allowing at least some of the calcium carbide to dissolve in the molten iron at such temperature.

2. Process according to claim 1, in which said calcium addition agent is selected from the group consisting of metallic calcium, calcium alloys, calcium carbide, calcium silicide, calcium carbonate, calcium hydroxide, and calcium salts of organic acids.

3. Process according to claim 1 in which the calcium addition agent is added to molten iron at a temperature below 1650° C., and the temperature is then raised to at least 1650° C.

4. Process according to claim 1 in which the calcium addition agent is added to the molten iron at a temperature of at least 1650° C.

5. Process according to claim 1 in which the calcium addition agent is calcium carbide and is added to the molten iron at a temperature below 1650° C. and the temperature is then raised to at least 1650° C.

6. Process for the production of cast iron containing calcium which comprises adding calcium carbide to molten iron at a temperature of at least 1650° C. in quantity more than sufficient to ensure reduction of any sulphur content of the iron to not more than about 0.02 per cent, and allowing at least some of the calcium carbide to dissolve in the molten iron at said temperature.

7. Process for the production of an improved grey cast iron which includes the step of introducing at least 0.02% of available calcium into a molten iron containing not more than about 0.02 per cent sulphur, which on casting gives a grey cast iron of hypereutectic carbon content, the melt being maintained at a temperature of at least 1650° C. for a period of time sufficiently long to effect solution of calcium in said molten iron.

8. Process for the production of an improved grey cast iron which comprises melting an iron which on casting gives a grey cast iron of hypereutectic carbon content, adding to the melt a calcium-oxide-generating substance, converting the calcium oxide in contact with the molten iron into calcium carbide by maintaining the temperature at not less than 1650° C., and allowing some at least of the calcium carbide to dissolve in the molten iron at said temperature, the amount of calcium-oxide-generating substance added being sufficient to reduce the sulphur content of the metal in the as-cast state to at most 0.02% and also to provide calcium dissolved in the metal in amount equal to at least 0.02% in the as-cast iron.

9. Process according to claim 8 which includes the step of adding to the molten iron, after the dissolution of calcium carbide, a graphitising inoculant.

10. Process for the production of an improved gray cast iron having at least a substantial part of its graphitic carbon content in nodular form, which comprises maintaining a suitable calcium addition agent in contact with molten iron whose composition is characteristic of gray cast iron hypereutectic in respect to carbon and containing not more than 0.02 per cent sulphur, at a temperature of at least 1650° C., until the molten metal has taken up calcium to such an extent that, upon casting, the as-cast product will contain at least 0.02 per cent calcium uncombined with sulphur.

11. Grey cast iron hypereutectic in relation to carbon which contains at least about 0.02 per cent calcium, uncombined with sulphur, in solid solution alloyed therewith and no sulphur in excess of 0.02 per cent, and in which, in its as-cast state, at least a preponderating proportion of its carbon content is in the form of graphite having a nodular microstructure.

12. Grey cast iron hypereutectic in relation to carbon which contains between about 0.02 and 0.25 per cent calcium, uncombined with sulphur, in solid solution alloyed therewith and no sulphur in excess of 0.02 per cent, and in which, in its as-cast state, at least a preponderating proportion of its carbon content is in the form of graphite having a nodular microstructure, said iron exhibiting by standard strength tests mechanical properties superior to those of comparable grey cast iron not containing calcium.

HENTON MORROGH.

References Cited in the file of this patent

UNITED STATES PATENTS

| Number | Name | Date |
|---|---|---|
| 1,471,401 | Koppers | Oct. 23, 1923 |
| 1,683,087 | Meehan | Sept. 4, 1928 |
| 2,409,020 | Crowe | Oct. 8, 1946 |
| 2,501,059 | Kluijtmans | Mar. 21, 1950 |
| 2,527,037 | Smalley | Oct. 24, 1950 |

FOREIGN PATENTS

| Number | Country | Date |
|---|---|---|
| 531,380 | Great Britain | Jan. 2, 1941 |
| 770,112 | France | June 18, 1934 |

OTHER REFERENCES

American Foundryman, April 1948, page 96.
Metal Progress, April 1932, pages 60 and 61.
Stahl und Eisen, vol. 28, 1908, pages 873 to 876.